C. E. WILSON AND L. O. PARKER.
DYNAMO ELECTRIC MACHINE.
APPLICATION FILED NOV. 16, 1917.

1,363,630.

Patented Dec. 28, 1920.
4 SHEETS—SHEET 4.

WITNESSES:
Olen E. Bee.

INVENTOR
Charles E Wilson, +
Leslie O. Parker.
BY
ATTORNEY.

UNITED STATES PATENT OFFICE.

CHARLES E. WILSON, OF WILKINS TOWNSHIP, ALLEGHENY COUNTY, AND LESLIE O. PARKER, OF SWISSVALE, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,363,630.  Specification of Letters Patent.  Patented Dec. 28, 1920.

Application filed November 16, 1917. Serial No. 202,310.

*To all whom it may concern:*

Be it known that we, CHARLES E. WILSON, a citizen of the United States, and a resident of Wilkins township, in the county of Allegheny and State of Pennsylvania, and LESLIE O. PARKER, a citizen of the United States, and a resident of Swissvale, in the county of Allegheny and State of Pennsylvania, have invented a new and useful Improvement in Dynamo-Electric Machines, of which the following is a specification.

Our invention relates to dynamo-electric machines and particularly to certain structural features of generators for use on automobiles or other vehicles for supplying current to batteries, lights, and other devices.

The object of our invention is to provide an end-bracket structure for such a generator on which mechanisms may be conveniently arranged and mounted so as to be fully protected from injury and still be accessible for inspection, adjustment and repair.

Figure 1:
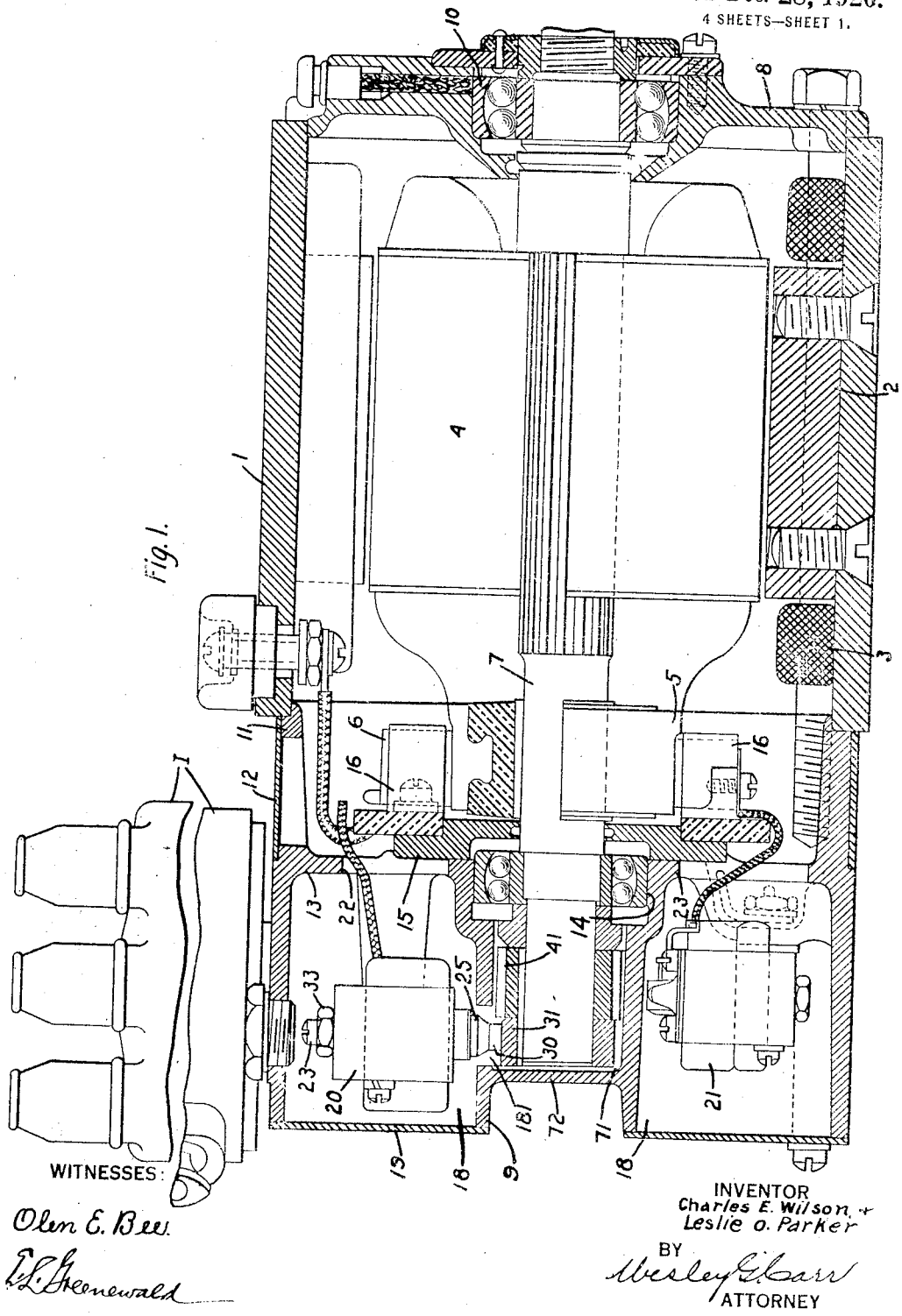
Figure 2:
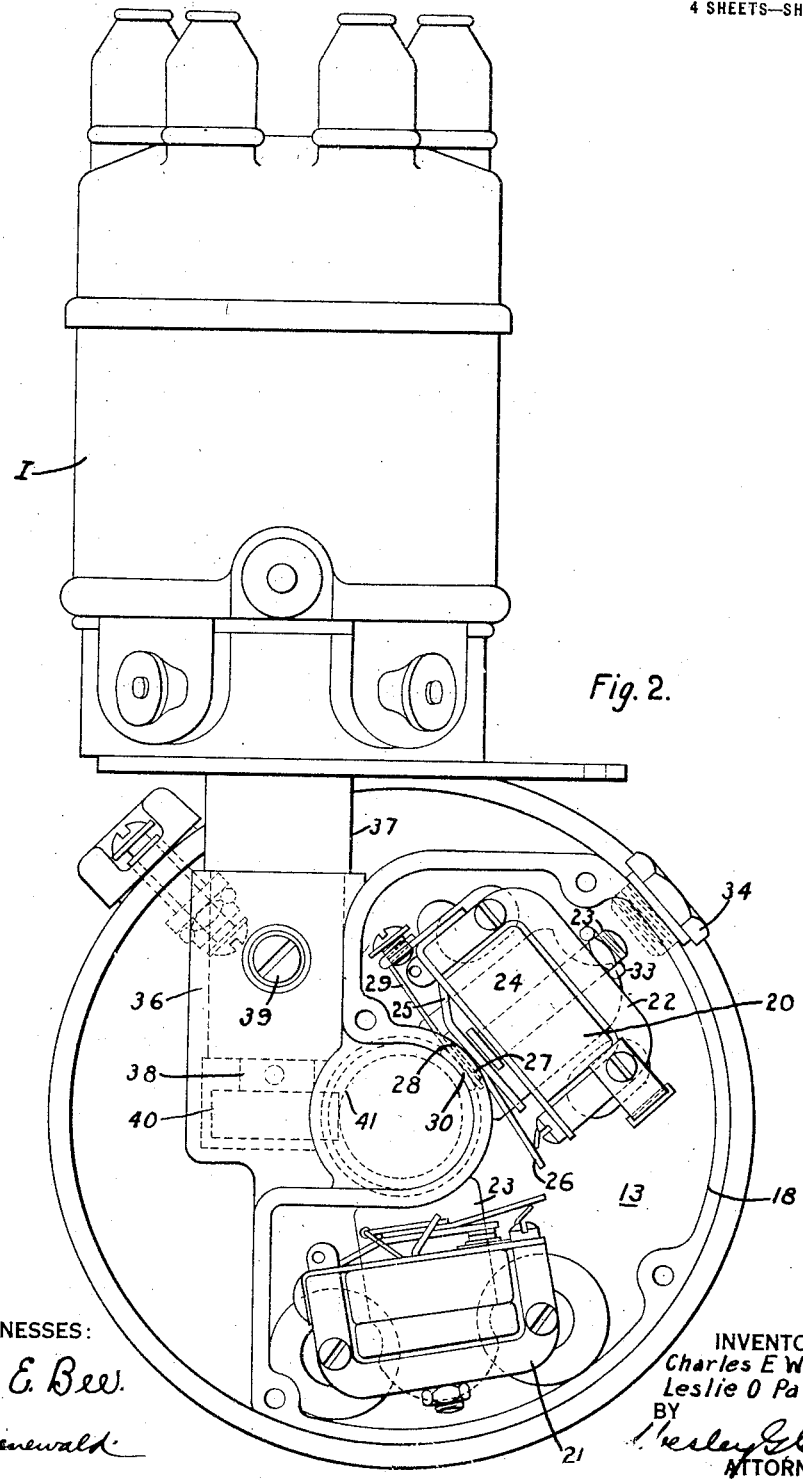
Figure 3:
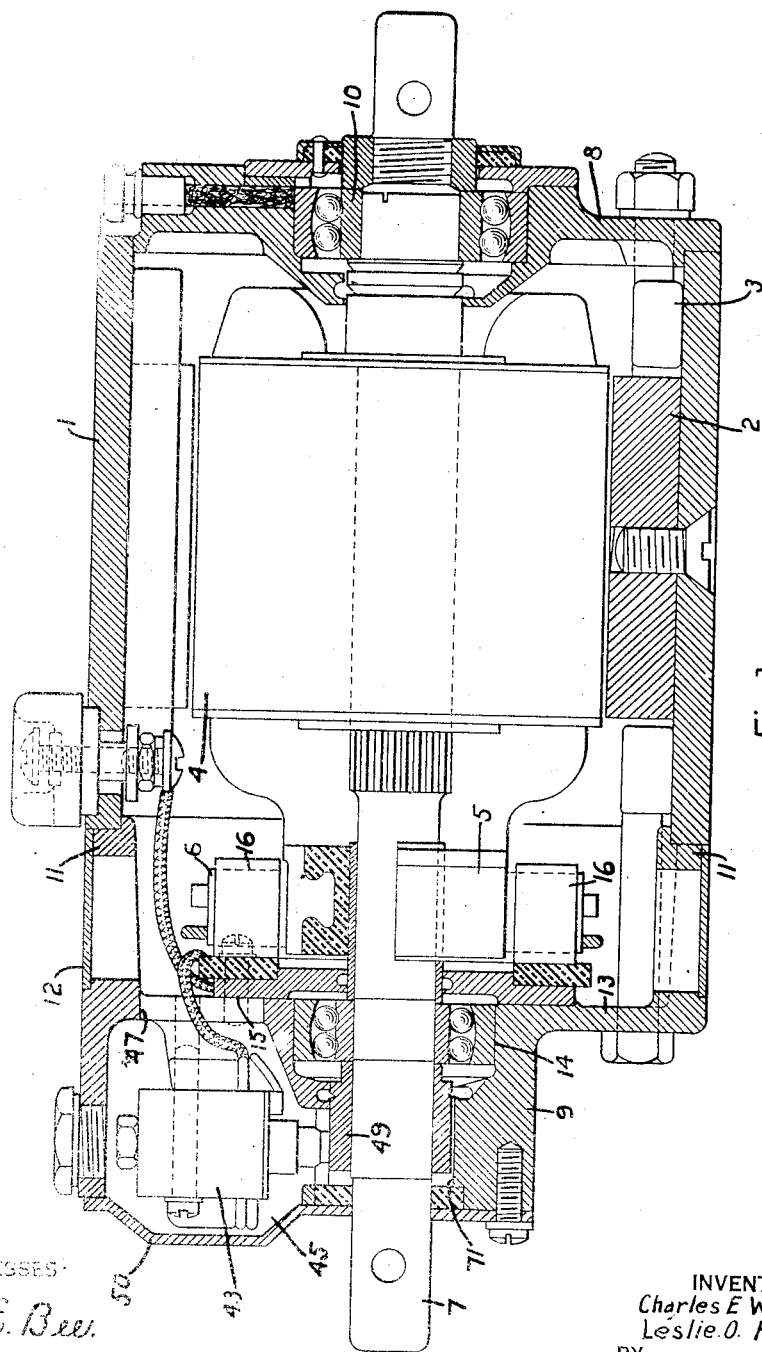
Figure 4:
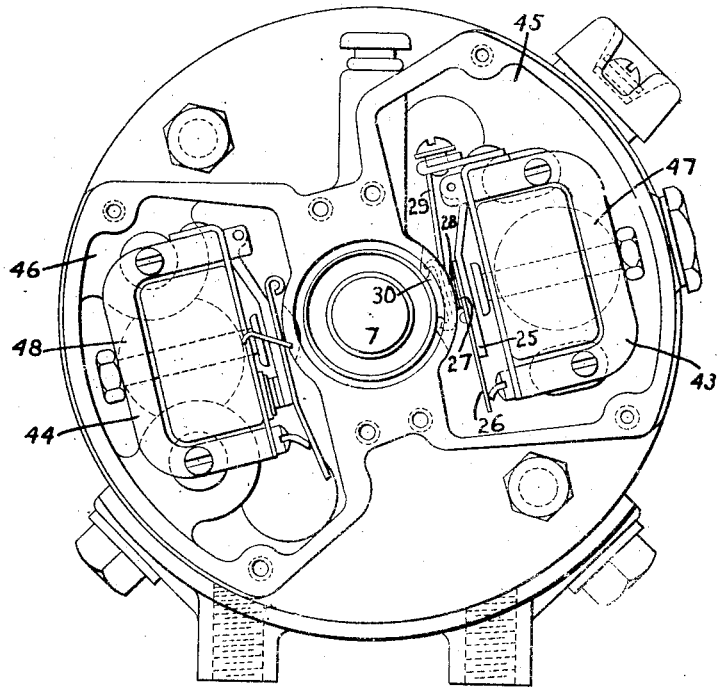

The above and other objects and the novel features of the invention will be apparent from the following description, taken in connection with the accompanying drawings which constitute a part of this application and in which Figure 1 is a view, mainly in longitudinal section but partially in side elevation, of a generator embodying the invention. Fig. 2 is a view, in end elevation, of a generator embodying the invention, showing the improved end bracket for supporting ignition and controlling mechanisms, the cover of the regulator and cutout compartment being omitted. Fig. 3 is a sectional view of another generator embodying our invention, and Fig. 4 is an end view of the generator shown in Fig. 3, the cover of the regulator and cutout compartments being removed.

The dynamo-electric machine comprises a cylindrical frame or yoke member 1, pole pieces 2 that are bolted to the inner surface of the yoke member and are surrounded by field coils 3, an armature 4, a commutator cylinder 5, brushes 6, and a shaft 7 upon which the armature and commutator cylinder are mounted. Circular end brackets 8 and 9 are attached to, and close the ends of, the cylindrical field frame or yoke 1, the brackets being disposed within the marginal outline of the yoke to provide a circular section for the structure that lends itself to cradle mounting on the engine. The bracket 8 has a central opening therein containing an anti-friction bearing 10 for the armature shaft 7 that projects through said bearing.

The end bracket 9 at the commutator end of the machine embodies the features of the present invention and has a cylindrical flange portion 11 that surrounds the commutator cylinder 5 and the brushes 6 and is provided with openings, closed by a cylindrical cover 12 that is removable to permit of inspection and adjustment of the brushes. The bracket 9 also has a disk-like partition or wall 13 within the flange 11 that is provided with a central opening 14 through which the shaft extends into a compartment 71 outside of the wall 13. A rocker ring 15, that carries holders 16 for the brushes 6, is attached to the inner side of the wall 13.

The outer end face of the bracket 9 is provided with walls that form a completely inclosed compartment 18 with the wall 13 and the cover 19. The compartment 18 contains current controlling mechanism connected in circuit with the generator, said mechanism comprising a regulator 20 for the field excitation of the generator and a cutout switch 21 for controlling the connections of the generator to the external circuit in accordance with the generator voltage. The connecting leads of the regulator and cutout switch to the generator pass through openings 22 and 23 in the wall 13.

The regulator 20 is described in Patent No. 1,180,039 and is also described more specifically in another application, Serial No. 200,663 filed Nov. 7, 1917, that has also been assigned to the Westinghouse Electric & Manufacturing Company. Inasmuch as the present invention does not appertain to the regulator or cutout structures, they will be described only briefly.

The regulator comprises a U-shaped magnetizable member 22 having an adjustable central leg 23 surrounded by a coil 24, a pivotally mounted armature 25 that extends across the end of, and is subjected to, the influence of the central leg 23, a plate spring 26 tending to separate the armature from the central leg 23, a contact member 27 carried by the armature, a coöperating contact member 28 that is mounted upon one end of a plate spring 29, the other end of which is rigidly supported, and a wear piece 30 that is attached to the plate spring 29 on the side opposite the contact member 28. An opening 181 connects the compartment 18 with the compartment 71 that contains the end of the armature shaft 7. The shaft compartment 71 is closed at the outer side by a wall 72 to exclude dust. A cam or eccentric 31, that is mounted upon the shaft 7, extends into the opening 181 and engages the wear piece 30, thereby causing vibration of the contact member 28 at a rate corresponding to the speed of the shaft. The central leg 23 is threaded in the U-shaped magnetizable member 21 and is provided with a slot in its outer end to permit of its being turned by means of a screwdriver, and a lock nut 33 is provided for locking it in adjusted position. The wall of the compartment 18 is provided with a threaded opening opposite the outer end of the member 23 and the lock nut 33, through which access may be gained to the said members for adjustment without disturbing other parts of the machine, a screw threaded plug or cap 34 being provided for the said opening.

The function of the cutout switch 21 is similar to that of cutout devices that are usually employed in connection with generators that are driven at variable speeds and are adapted to supply current to storage batteries, since it operates to connect the generator to the storage battery only when the generator voltage equals or exceeds that of the battery. The cutout serves to prevent the battery from supplying current to the generator, which would cause the latter to operate as a motor.

The regulator and cutout compartment 18 occupies about two-thirds of the area of the outside face of the bracket 9, and an integral socket 36, for supporting the ignition unit 1, occupies most of the remaining space. The socket 36 is open at the top to receive the stem 37 surrounding the lower end of the shaft 38 of the ignition unit, the stem fitting the socket tightly to exclude dust and moisture and being clamped in place by a screw 39. The axis of the socket is vertical and, at its lower end, the socket opens into the shaft compartment 71 so that a worm gear 40 on the shaft of the ignition unit may be connected in driving relation with the worm wheel 41 on the armature shaft 7. The ignition unit 1 contains the usual ignition mechanism for use with gas engines, comprising timing mechanism and make-and-break devices operated by the shaft 38 but the details of these form no part of this invention.

It will be observed that the structure above set forth is exceptionally compact and that the parts are very conveniently arranged while, at the same time, they are fully protected from dirt and moisture and from the possibility of all external injury.

In Figs. 3 and 4, we have illustrated an end-bracket construction which, in most respects, is similar to that shown in Figs. 1 and 2. The principal difference is that the socket or mounting for the ignition unit has been omitted and the regulator 43 and cutout switch 44 are located in separate, completely inclosed compartments 45 and 46 carried by the partition and respectively communicating with the commutator chamber through openings 47 and 48. The compartments are located on diametrically opposite sides of the armature shaft, which carries a cam 49 exposed in the regulator compartment to operate the contact member 28, as previously described. Removable covers 50 are provided to close the compartments at the outside.

For some uses the generator does not require the cutout switch and this may, therefore, be omitted, if desired. It will also be obvious that other changes may be made in the construction of the end bracket without departing from the spirit and scope of the invention.

We claim as our invention:

1. A dynamo-electric machine comprising a cylindrical frame containing the field-magnet and armature structures, an end bracket attached to said frame and having a compartment and also having a wall closing one end of the frame, said wall forming the inner side of the compartment and having a bearing support for one end of the armature shaft, and a current regulator in said compartment connected in circuit with said dynamo-electric machine.

2. A dynamo-electric machine comprising a cylindrical frame of magnetic material for containing the field magnet and armature structures, a circular end bracket attached to said frame and comprising a wall closing one end of said frame, part of said wall constituting a wall of a compartment in said bracket, and said bracket also having a bearing support for the armature shaft that is exposed in said compartment, a current regulator in said compartment, said wall having an opening through which the conductors between the regulator and the machine are passed, and means on said armature shaft for operating said regulator.

3. A dynamo-electric machine comprising a frame containing the field-magnet and armature structures, an end bracket attached to said frame and comprising a wall closing one end of said frame and having a part constituting a partition between the interior of the frame and a compartment on the exterior side of the wall, a rocker ring on the inside of said wall, brush holders on said ring, a bearing support on said wall for the armature shaft which has a portion thereof exposed in said compartment, a cam upon the exposed portion of the armature shaft, and current-regulating means in said compartment, and actuated by said cam, said wall having an opening through which the conductors between the regulator and the machine are passed.

4. A generator comprising a cylindrical frame containing the field-magnet and armature structures, and an end bracket attached to said frame within the margin of the latter and having a compartment, said bracket comprising a wall that closes one end of the frame and has a part constituting one side of said compartment, a cover for said compartment, said wall having a bearing support for one end of the armature shaft, and a current regulator in said compartment connected in circuit with said generator by conductors passing through said wall, said compartment having a separate opening for permitting the adjustment of the regulator without removing said cover.

5. A dynamo-electric machine comprising a cylindrical frame containing the field-magnet and armature structures, a circular end bracket attached to said frame and comprising a wall that closes one end of the frame, a compartment formed outside said frame, and independently acting current-controlling devices located in said compartment for controlling said dynamo-electric machine and mounted on one side of said wall.

6. A dynamo-electric machine comprising a cylindrical frame containing the field-magnet and armature structures, a circular end bracket attached to said frame comprising a wall that closes one end of the frame, a bearing on said wall for supporting the end of the armature shaft, independently acting current-controlling devices for said dynamo-electric machine mounted on the outside of said wall, and means for inclosing said controlling devices.

7. A dynamo-electric machine comprising a cylindrical frame containing the field-magnet and armature structures, an end bracket attached to said frame and having a compartment, said bracket comprising a wall that closes one end of the frame and has a part constituting one side of said compartment, a bearing on said wall for the armature shaft, and independently acting current-controlling devices in said compartment spaced around said bearing.

8. A dynamo-electric machine comprising a cylindrical frame containing the field-magnet and armature structures, an end bracket attached to said frame and having a compartment, said bracket comprising a wall that closes one end of the frame and has a part constituting the inner side of said compartment, a current regulating device and a cutout device mounted in said compartment, said devices being connected to said machine by conductors passing through said wall, and a removable cover for the compartment.

9. A dynamo-electric machine comprising a cylindrical frame containing the field-magnet and armature structures, an end bracket therefor comprising a wall that closes one end of the frame, a bearing on said wall through which the armature shaft extends, a compartment formed on said bracket outside the wall, a cam on the armature shaft outside of the wall, a current regulator operated by said cam and located within said compartment.

10. A dynamo-electric machine comprising a cylindrical frame containing the field-magnet and armature structures, and an end bracket attached to, and closing one end of, said frame, said bracket having a compartment to receive a current-controlling device and also having a mounting for an ignition unit, current-regulating means in said compartment, an ignition unit supported on said mounting, and a cover for said compartment.

11. A dynamo-electric machine comprising a frame containing the field-magnet and armature structures, an end bracket attached to, and closing one end of, said frame, said bracket having a compartment to receive a current-controlling means and also having a socket in its outer side to receive a part of an ignition unit, means on said bracket for supporting the armature shaft, current-controlling means in said compartment, and means on said shaft adapted to extend into said compartment to actuate said controlling means.

12. A dynamo-electric machine comprising a frame containing the field-magnet and armature structures, an end bracket attached to, and closing one end of, said frame, ignition mechanism mounted on said bracket, a compartment formed on said bracket, current-regulating means mounted within said compartment, and means whereby said armature shaft actuates said ignition mechanism and said regulating means, said compartment having a small opening in one wall for permitting adjustment of the regulating means.

13. A dynamo-electric machine comprising a cylindrical frame containing the field-magnet and armature structures, an end bracket attached to, and closing one end of, said frame, ignition mechanism mounted on said bracket, a regulator on said bracket for controlling the field-magnet excitation, a cutout device on said bracket for controlling the connections of the machine to an external circuit, and means whereby said armature shaft actuates said ignition mechanism.

14. A dynamo-electric machine comprising a cylindrical frame containing the field-magnet and armature structures, an end bracket attached to, and closing one end of, said frame, said bracket having a compartment formed integral therewith and also having an upwardly opening socket integral therewith, current-controlling means in said compartment, an ignition head having a stem fitting in said socket, and a driving connection between said armature and the ignition mechanism carried by said head.

15. A dynamo-electric machine comprising a frame containing the field-magnet and armature structures, an end bracket attached to, and closing one end of, said frame, said bracket having a compartment formed integral therewith and also having an upwardly opening socket integral therewith, a voltage regulator and a cutout switch in said compartment, an ignition mechanism head having a stem fitting in said socket, said bracket having an opening to receive a bearing for the armature shaft, said opening communicating with said socket and with said compartment, and means whereby said armature shaft drives the ignition mechanism and the regulator.

16. A dynamo-electric machine comprising a frame containing the field-magnet and armature structures, an end bracket attached to, and closing the commutator end of, said frame, said bracket having a bearing thereon for the armature shaft and also having a flange portion extending around the commutator on the armature, one or more openings in said flange portion opposite the commutator, removable means for closing said opening or openings, current-controlling means carried by said bracket, and means for inclosing said current-controlling means.

17. A dynamo-electric machine comprising a cylindrical frame containing the field-magnet and armature structures, a circular end bracket attached to, and closing the commutator end of, said frame, said bracket having a bearing thereon for the armature shaft and also having a flange portion extending around the commutator, one or more openings in said flange portion opposite the commutator, a removable cover for said opening or openings, said bracket having a compartment therein separated by a wall from the brushes and commutator, current-regulating means in said compartment, means passing through openings in said wall for connecting said controlling means to said brushes, and driving means operatively connecting said shaft to said current-controlling means.

In testimony whereof, we have hereunto subscribed our names this 22nd day of Oct., 1917.

CHARLES E. WILSON.
LESLIE O. PARKER